(12) United States Patent
Chaudhry et al.

(10) Patent No.: US 7,277,989 B2
(45) Date of Patent: Oct. 2, 2007

(54) SELECTIVELY PERFORMING FETCHES FOR STORE OPERATIONS DURING SPECULATIVE EXECUTION

(75) Inventors: Shailender Chaudhry, San Francisco, CA (US); Marc Tremblay, Menlo Park, CA (US); Paul Caprioli, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 276 days.

(21) Appl. No.: 11/083,264

(22) Filed: Mar. 16, 2005

(65) Prior Publication Data

US 2006/0020757 A1   Jan. 26, 2006

Related U.S. Application Data

(60) Provisional application No. 60/582,396, filed on Jun. 22, 2004.

(51) Int. Cl.
*G06F 12/00* (2006.01)
(52) U.S. Cl. .................................. 711/122; 711/130
(58) Field of Classification Search .................. None
See application file for complete search history.

(56) References Cited

U.S. PATENT DOCUMENTS 6,065,103 A * 5/2000 Tran et al. .................. 711/156
6,925,524 B2 * 8/2005 Chow et al. ................ 711/108
2002/0199070 A1 * 12/2002 Chaudhry et al. .......... 711/147
2004/0088491 A1   5/2004 Jouppi et al. ............... 711/137

FOREIGN PATENT DOCUMENTS

WO    WO 03/001383 A2   1/2003

OTHER PUBLICATIONS

John Hennessy and David Patterson, Computer Architecture A Quantitative Approach, 1996, Morgan Kaufman Publishers, Second Edition, pp. 677-685.*
"MIPS R10000 Microprocessor User's Manual", Version 2.0, Oct. 10, 1996, XP-002387380, p. 22.

* cited by examiner

*Primary Examiner*—Reginald Bragdon
*Assistant Examiner*—Shawn Gu
(74) *Attorney, Agent, or Firm*—Park, Vaughan & Fleming LLP

(57) ABSTRACT

One embodiment of the present invention provides a processor which selectively fetches cache lines for store instructions during speculative-execution. During normal execution, the processor issues instructions for execution in program order. Upon encountering an instruction which generates a launch condition, the processor performs a checkpoint and begins the execution of instructions in a speculative-execution mode. Upon encountering a store instruction during the speculative-execution mode, the processor checks an L1 data cache for a matching cache line and checks a store buffer for a store to a matching cache line. If a matching cache line is already present in the L1 data cache or if the store to a matching cache line is already present in the store buffer, the processor suppresses generation of the fetch for the cache line. Otherwise, the processor generates a fetch for the cache line.

20 Claims, 6 Drawing Sheets

SELECTIVELY PERFORMING FETCHES FOR STORE OPERATIONS DURING SPECULATIVE EXECUTION

RELATED APPLICATION

This application hereby claims priority under 35 U.S.C. §119 to U.S. Provisional Patent Application No. 60/582,396 filed on 22 Jun. 2004, entitled "Selectively Performing Fetches for Store Operations During Speculative Execution," by inventors Shailender Chaudhry, Marc Tremblay and Paul Caprioli.

BACKGROUND

1. Field of the Invention

The present invention relates to techniques for improving the performance of computer systems. More specifically, the present invention relates to a method and an apparatus for selectively performing fetches for store operations during speculative execution. relates to a method and an apparatus for selectively performing fetches for store operations during speculative execution.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two cache or main memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that are available for register renaming purposes during out-of-order execution also limits the effective size of the issue queue.

Some processor designers have proposed using speculative-execution modes to avoid the pipeline stalls associated with cache line misses. Two of these speculative-execution modes are: (1) execute-ahead mode and (2) scout mode.

Execute-ahead mode operates as follows. During normal execution, the system issues instructions for execution in program order. Upon encountering an unresolved data dependency during execution of an instruction, the system generates a checkpoint that can be used to return execution of the program to the point of the instruction. Next, the system executes subsequent instructions in the execute-ahead mode, wherein instructions that cannot be executed because of an unresolved data dependency are deferred, and wherein other non-deferred instructions are executed in program order.

If the unresolved data dependency is resolved during execute-ahead mode, the system enters a deferred execution mode, wherein the system executes deferred instructions. If all deferred instructions are executed during this deferred execution mode, the system returns to normal execution mode to resume normal program execution from the point where the execute-ahead mode left off.

If the system encounters a non-data-dependent stall condition while executing in normal mode or execute-ahead mode, the system moves to a scout mode. In scout mode, instructions are speculatively executed to prefetch future loads, but results are not committed to the architectural state of the processor. When the launch point stall condition (the unresolved data dependency or the non-data dependent stall condition that originally caused the system to move out of normal execution mode) is finally resolved, the system uses the checkpoint to resume execution in normal mode from the launch point instruction (the instruction that originally encountered the launch point stall condition).

By allowing a processor to continue to perform work during stall conditions, speculative-execution can significantly increase the amount of work the processor completes.

However, certain operations, such as stores, can become complicated during speculative-execution. During normal execution, a store instruction takes place as follows. First the system generates a fetch for a cache line associated with the store. Next, the system places the store into a store buffer and waits for the cache line to be fetched into the cache. When the fetch eventually returns the cache line, the store from the store buffer is written to the cache line.

Note that a fetch may not be necessary because the cache line already has a store pending in the store buffer which has generated a fetch for the cache line or the cache line is already present in the L1 data cache. In these cases, valuable memory system bandwidth can be saved if the fetch is not generated.

During speculative execution, as in normal execution, fetches are generated for store instructions. However, these fetches may be unnecessary because the cache line is currently being fetched or is already present in the L1 data cache.

Hence, what is needed is a processor which selectively fetches cache lines for store operations.

SUMMARY

One embodiment of the present invention provides a processor which selectively fetches cache lines for store instructions during speculative-execution. During normal execution, the processor issues instructions for execution in program order. Upon encountering an instruction which generates a launch condition, the processor performs a checkpoint and begins the execution of instructions in a speculative-execution mode. Upon encountering a store instruction during the speculative-execution mode, the processor checks an L1 data cache for a matching cache line and checks a store buffer for a store to a matching cache line. If a matching cache line is already present in the L1 data cache or if the store to a matching cache line is already present in the store buffer, the processor suppresses generation of the fetch for the cache line. Otherwise, the processor generates a fetch for the cache line.

In a variation of this embodiment, checking the store buffer involves performing a Content-Addressable Memory (CAM) lookup on the store buffer.

In a variation of this embodiment, the L1 data cache allows simultaneous lookups and writes, thereby enabling the cache line to be checked without interfering with other processor memory operations.

In a variation of this embodiment, the processor is part of a multiprocessor system that has one or more L2 caches which are shared between two or more processor cores.

In this variation, the L1 data cache contains MOESI (Modified-Owner-Exclusive-Shared-Invalid) status bits indicating an ownership status for each cache line.

In this variation, the MOESI status bits are copied from the L2 cache to the L1 data cache when the cache line status changes. Additionally, if the cache line is already present in the L1 data cache, generation of the fetch is suppressed only if the MOESI status bits indicate that the processor has write permission for the cache line.

In a variation of this embodiment, if the launch condition is a stall condition, the processor enters a scout mode. In scout mode, instructions are speculatively executed to fetch future loads, but the results are not committed to the architectural state of the processor.

In a variation of this embodiment, if the launch condition is an unresolved data dependency, the processor enters an execute-ahead mode. In execute-ahead mode, instructions that cannot be executed because of an unresolved data dependency are deferred, and other non-deferred instructions are executed in program order.

In a variation of this embodiment, the unresolved data dependency can include a use of an operand that has not returned from a preceding load miss; a use of an operand that has not returned from a preceding translation lookaside buffer miss; a use of an operand that has not returned from a preceding full or partial read-after-write from store buffer operation; and a use of an operand that depends on another operand that is subject to an unresolved data dependency.

In a variation of this embodiment, the processor returns to normal execution mode when the processor encounters a condition that causes the processor to exit speculative-execution mode.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Processor

Figure 1:
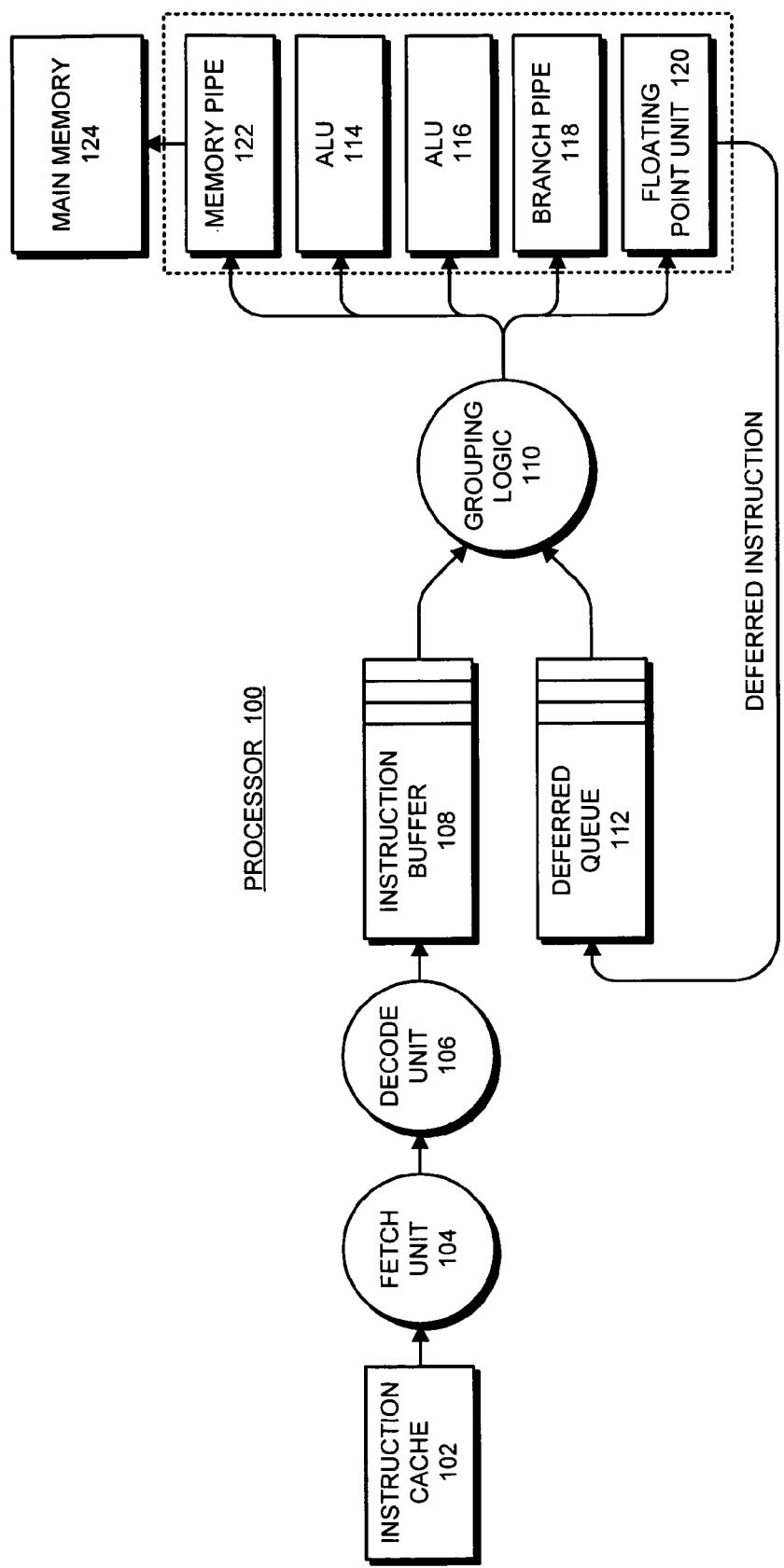
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions.

Fetching within the Stages of the Pipeline

Figure 2:
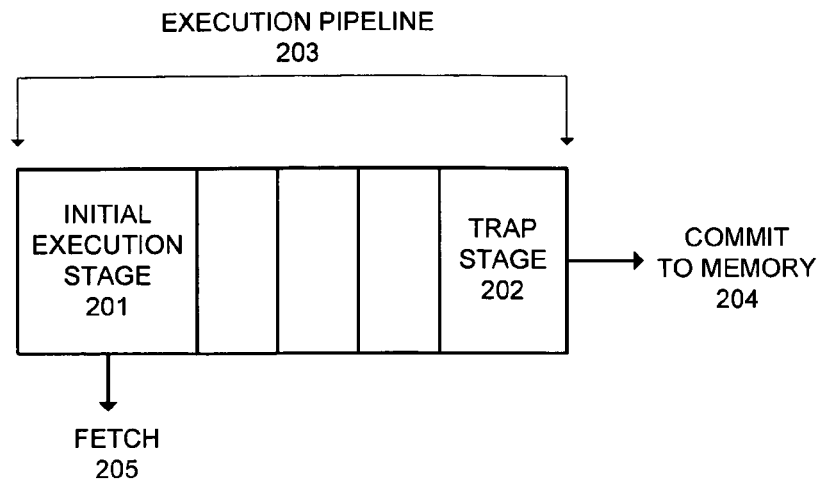
FIG. 2 illustrates an execution pipeline in accordance with a variation of the present invention.

FIG. 2 illustrates execution pipeline 203 in accordance with an embodiment of the present invention. Execution pipeline 203 is divided into a number of stages, including execution stage 201 and a trap stage 202.

Trap stage 202 catches exceptions that occur during the execution of instructions. Note that trap stage 202 is the last place in the pipeline to catch exceptions, such as a divide by zero exception. Once instructions pass trap stage 202, the results of the instructions are committed to the architectural state of the processor.

During the execution of a store instruction, a fetch 205 for a corresponding cache line is sent to system memory during initial execution stage 201.

State Diagram

Figure 3:
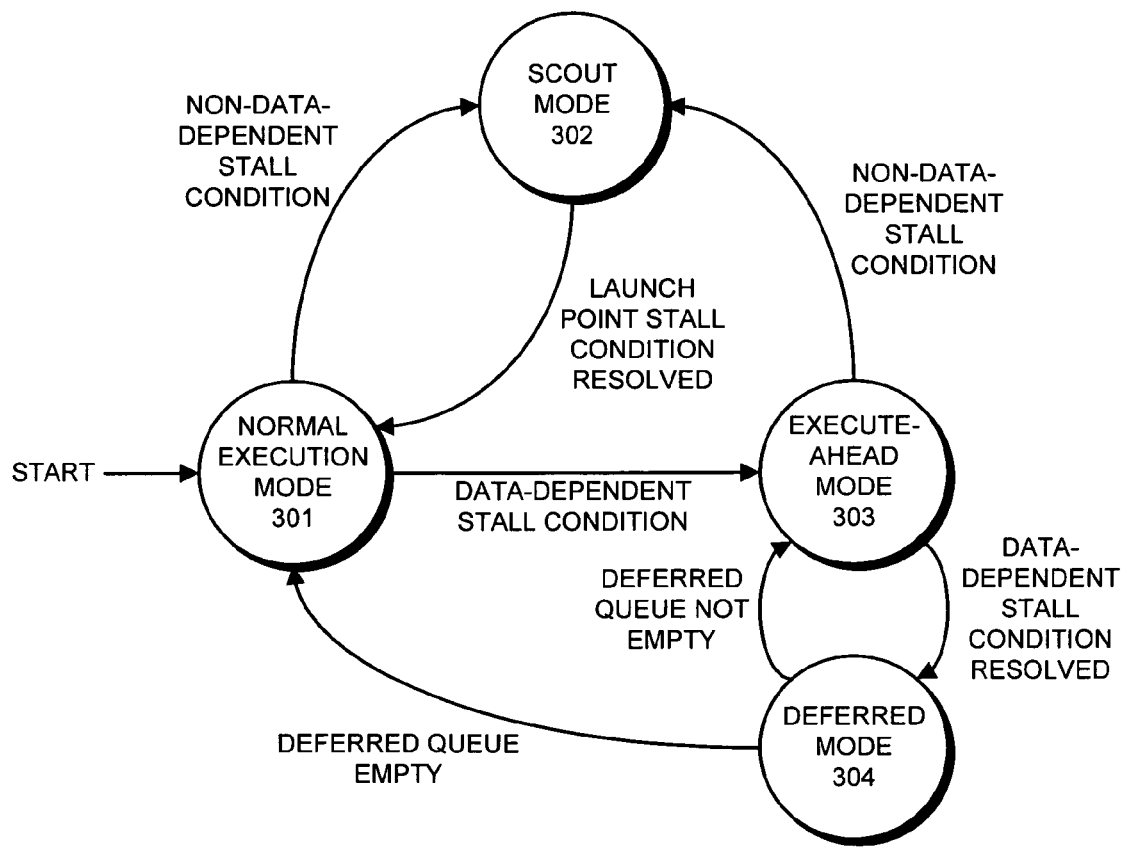
FIG. 3 presents a state diagram, which includes execute-ahead mode and scout mode, in accordance with an embodiment of the present invention.

FIG. 3 presents a state diagram which includes a general depiction of execute-ahead mode 303, scout mode 302, and deferred mode 304 in accordance with an embodiment of the present invention.

The system starts in normal-execution mode 301, wherein instructions are executed in program order as they are issued from instruction buffer 108 (see FIG. 1).

Next, if an unresolved data dependency arises during execution of an instruction, the system moves to execute-ahead mode 303. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 303, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 303 or deferred mode 304.) The system also "defers" execution of the instruction that encountered the unresolved data dependency by storing the instruction in deferred queue 112.

While operating in execute-ahead mode 303, the system continues to execute instructions in program order as they are received from instruction buffer 108, and any instructions that cannot execute because of an unresolved data dependency are deferred into deferred queue 112.

During execute-ahead mode 303, if an unresolved data dependency is finally resolved, the system moves into deferred mode 304, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instruction back into deferred queue 112. On the other hand, the system executes other instructions that can be executed in program order with respect to each other.

After the system completes a pass through deferred queue 112, if deferred queue 112 is empty, the system moves back into normal-execution mode 301. This may involve committing changes made during execute-ahead mode 303 and deferred mode 304 to the architectural state of processor 100, if such changes have not been already committed. The return to normal mode can also involve throwing away the checkpoint generated when the system moved into execute-ahead mode 303.

On the other hand, if deferred queue 112 is not empty after the system completes a pass through deferred queue 112, the system returns to execute-ahead mode 303 to execute instructions from instruction buffer 108 from the point where the execute-ahead mode 303 left off.

If a non-data dependent stall condition (except for a load buffer full or store buffer full condition) arises while the system is in normal-execution mode 301 or in execute-ahead mode 303, the system moves into scout mode 302. (This non-data-dependent stall condition can include: a memory barrier operation; or a deferred queue full condition.) In scout mode 302, instructions are speculatively executed to prefetch future loads, but results are not committed to the architectural state of processor 100.

Scout mode 302 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 302.

Unfortunately, computational operations performed during scout mode 302 need to be recomputed again, which can require a large amount of computational work.

When the original "launch point" stall condition is finally resolved, the system moves back into normal-execution mode 301, and, in doing so, uses the previously generated checkpoint to resume execution from the launch point instruction that encountered the launch point stall condition. The launch point stall condition is the stall condition that originally caused the system to move out of normal-execution mode 301. For example, the launch point stall condition can be the data-dependent stall condition that caused the system to move from normal-execution mode 301 to execute-ahead mode 303, before moving to scout mode 302. Alternatively, the launch point stall condition can be the non-data-dependent stall condition that caused the system to move directly from normal-execution mode 301 to scout mode 302.

Memory Pipeline Stages

Figure 4:
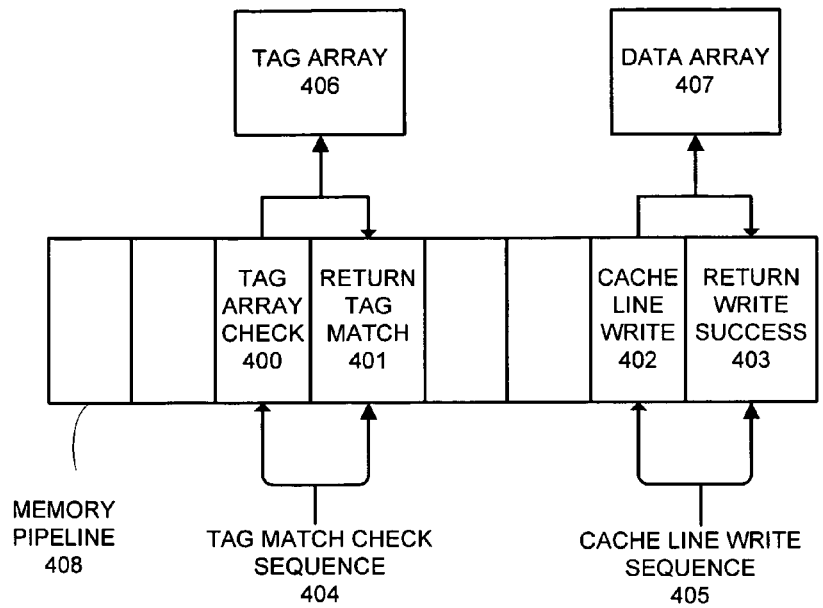
FIG. 4 illustrates a memory pipeline in accordance with an embodiment of the present invention.

FIG. 4 illustrates memory pipeline 408. Memory pipeline 408 interacts with tag array 406 and data array 407 of an L1 data cache. Tag array 406 contains address and status information for the cache lines. Data array 407 holds the cache lines.

Memory pipeline 408 includes stages that are associated with tag match check sequence 404 and cache line write sequence 405. During tag match check sequence 404, memory pipeline 408 checks for the presence of a requested cache line address in tag array 406. During cache line write sequence 405, memory pipeline 408 writes the data to data array 407. Note that pipelining caching operations allows memory pipeline 408 to process one memory access per clock cycle, thereby increasing memory access throughput.

In one embodiment of the present invention, memory pipeline 408 checks tag array 406 for the presence of a cache line without disrupting concurrent cache read or write operations.

Fetches within the CMP

Figure 5:
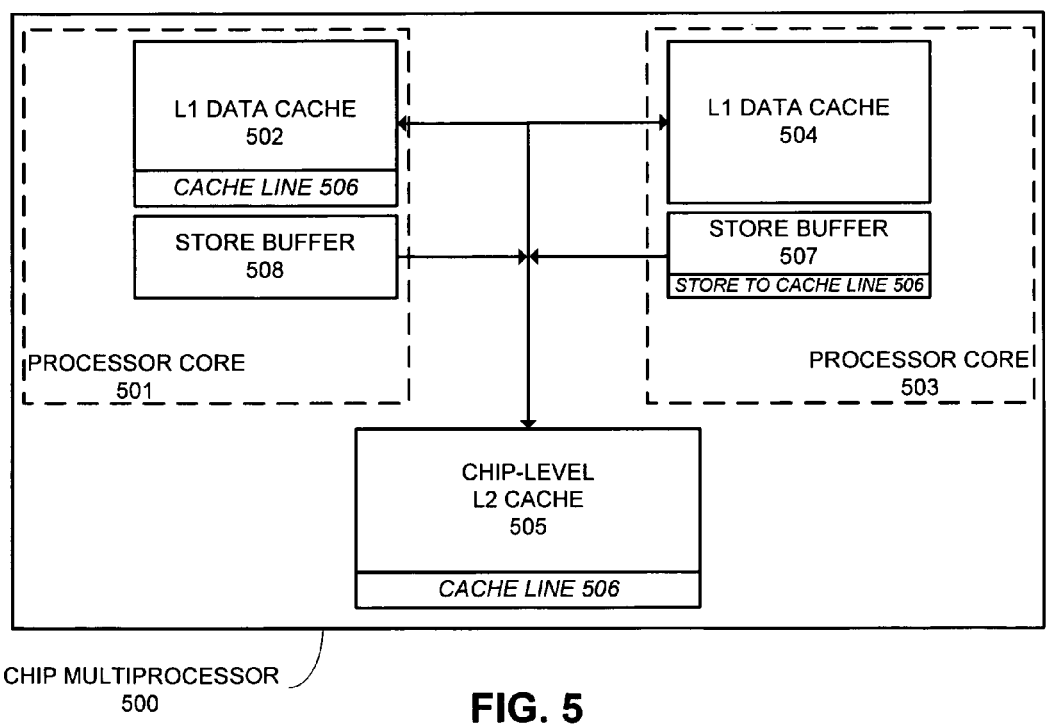
FIG. 5 illustrates the interaction between two processor cores on a chip multiprocessor (CMP) in a computer system in accordance with an embodiment of the present invention.

In FIG. 5, CMP 500 is a single die which contains two processor cores, 501 and 503. Each of these processor cores, 501 and 503, is a fully functional microprocessor.

Processor cores 501 and 503 have L1 data caches 502 and 504, respectively, and they share L2 cache 505. Along with L1 data caches 502 and 504, processor cores 501 and 503 have store buffers 508 and 507, which buffer pending store operations.

In processor core 501, cache line 506 is held in L1 data cache 502. Whereas in processor core 503, a store to cache line 506 is held in store buffer 507.

During a store operation, processor core 501 checks L1 data cache 502 for the presence of cache line 506. If processor core 501 receives a hit in L1 data cache 502, processor core 501 assumes that cache line 506 already resides in chip-level L2 cache 505. Processor core 501 therefore does not send a fetch to L2 cache 505 for cache line 506.

The assumption that a hit in the L1 cache implies a hit in the L2 cache is always right in a system where the cache is inclusive, because lines in L1 data cache are guaranteed to be in the L2 cache. However, even if the L1 data cache is not inclusive, the L2 cache is so much larger than the L1 data cache that a hit in the L1 data cache indicates a very high probability that the cache line is present in L2 cache.

In the event of a hit in the L1 data cache, which causes the fetch to be suppressed, and a subsequent miss in the L2 cache, it takes additional time to process the L2 cache miss. However, this case is so rare that the possible delay makes negligible difference in average store execution times.

During a store operation, processor core 503 checks store buffer 507 by performing a Content-Addressable Memory (CAM) lookup for a store instruction with a matching cache line 506. If there is a match, processor core 503 assumes that the earlier store generated a fetch for cache line 506 and does not generate a fetch.

Note that this system works for both write-back and write-through caches. A write-through cache works by immediately writing all cache lines back to L2 cache. A write-back cache, on the other hand, holds cache writes until the cache write must happen, such as when the cache line is replaced. In both of types of caches, examining the L1 data cache and the store buffer can eliminate the need for unnecessary fetches to be sent to the memory system.

Fetches between CMPs

Several systems for managing cache memory access are implemented in multiprocessor systems that use shared caches. One such system is the Modified-Owned-Exclusive-Shared-Invalid or MOESI system. In this system, the local L2 cache holds a copy of a cache line and as well as status bits indicating the ownership state of the cache line. If the cache line is marked as Modified or Exclusive, the processor has permission to alter the contents of the cache line. If the cache line is marked as Invalid, Shared, or Owned, the processor does not have the right to alter the contents. Note that the processor obtains permission to alter the cache line by requesting permission from the memory system.

In one embodiment of the present invention, the MOESI status bits are copied into a reserved location in the L1 data cache along with the cache line. While examining the MOESI status bits in the L1 data cache, the processor can perform a fast L1 lookup to determine the state and existence of the cache line in the L1 data cache. In this way, the processor can simultaneously gather important information about write permission for the cache line.

One embodiment of the present invention utilizes the L1 data cache MOESI system to avoid sending fetches out over memory bus 614. In this embodiment, the fetch is not generated during a store operation if the L1 data cache MOESI bits indicate that the local CMP has 'M' or 'E' permissions on the cache line, because the local CMP has write permission for cache lines in the 'M' or 'E' state.

In another embodiment, the MOESI states in the L2 cache are reduced to fewer states on recording in the L1 cache. For example, M and E are collapsed into a single "writable" state, and S and O are collapsed into a single "non-writeable" L2 cache state.

Figure 6:
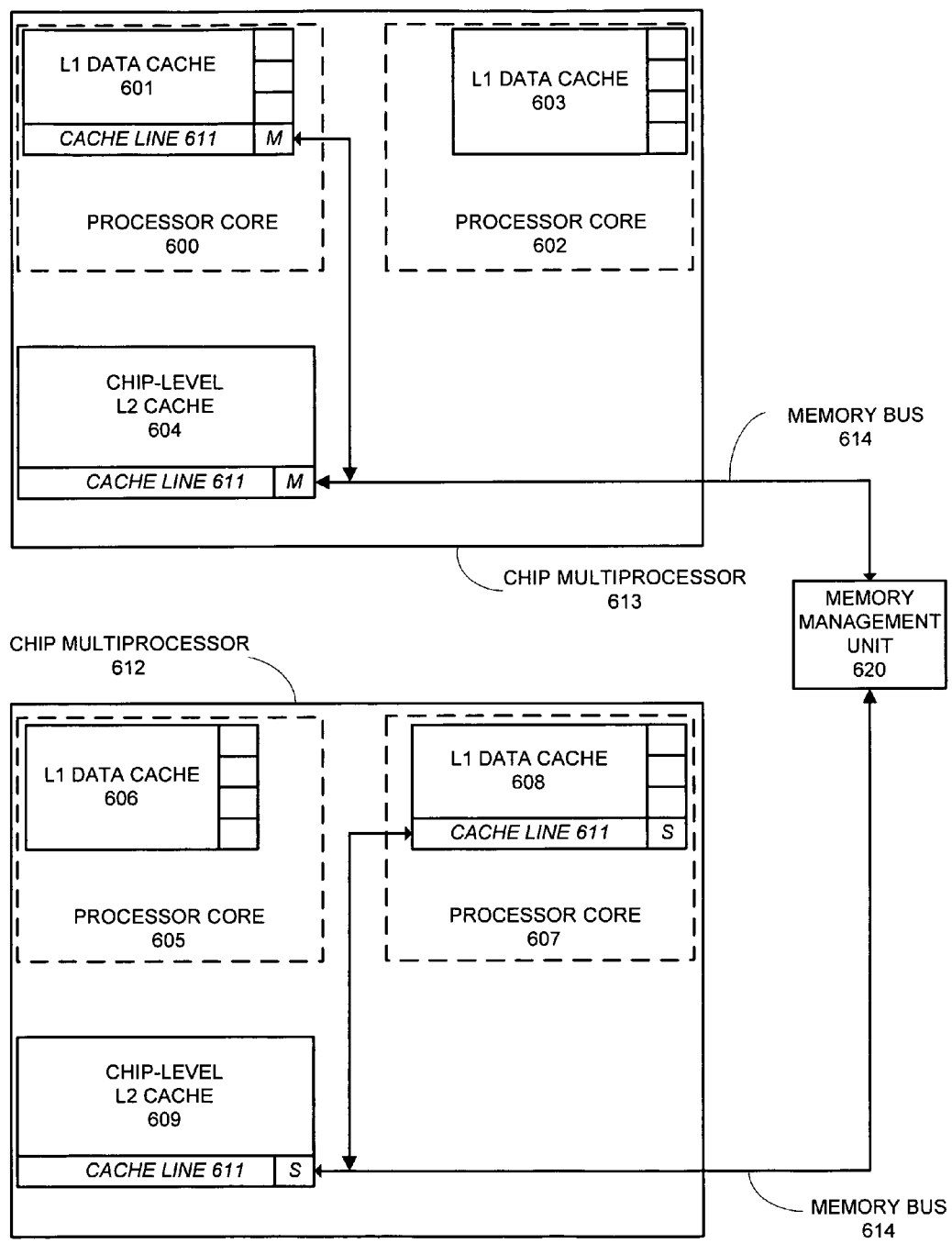
FIG. 6 illustrates the interaction between two CMPs in a computer system in accordance with an embodiment of the present invention.

FIG. 6 illustrates a computer system wherein multiple CMPs interact with one another. In this FIG. 6, there two CMPs, 612 and 613, each with two individual processor cores, 600/602 and 605/607. Between CMPs 612 and 613, memory management unit 620 controls the flow of traffic on memory bus 614.

When processor core 607 encounters a store instruction to cache line 611 with an unresolved dependency, processor core 607 defers the store instruction and performs an L1 data cache lookup in L1 data cache 608. Since cache line 611 is in the 'S' state, meaning that cache line 611 is shared between the CMP 612 and CMP 613, processor core 607 sends a fetch to the memory system to get write permission on cache line 611.

On the other hand, when processor core 600 encounters a store instruction to cache line 611 with an unresolved dependency, processor core 600 defers the store instruction and performs an L1 data cache lookup in L1 data cache 601. For this case, cache line 611 is already in L1 data cache 601 in the 'M' state. There is consequently no need for processor core 600 to generate a fetch for cache line 611. The external memory bandwidth savings in this case is significant, because the fetch for cache line 611 would ordinarily have to go out onto an external bus and may have to contend with other system memory requests.

Selectively Fetching for a Store Instruction During Execute-Ahead Mode

Figure 7:
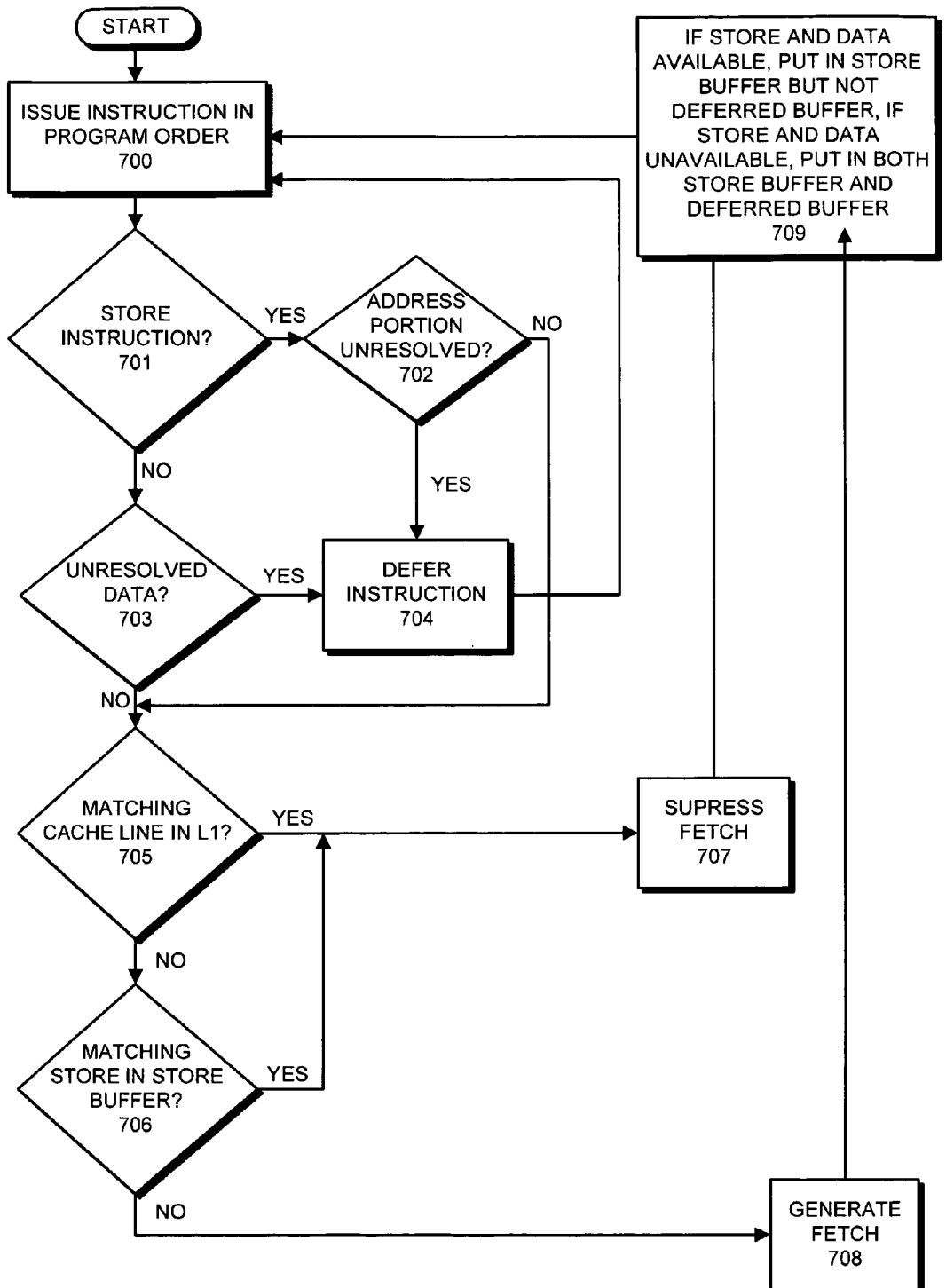
FIG. 7 presents a flow chart illustrating how a store is handled during execute-ahead mode in accordance with an embodiment of the present invention.

FIG. 7 presents a flow chart illustrating how a store is handled during execute-ahead mode in accordance with an embodiment of the present invention.

The processor starts by issuing an instruction in program order (step 700). The system then determines if the instruction is a store instruction (step 701). If so, the processor determines whether or not the address portion of the instruction is unresolved (step 702). If so, the system defers the instruction (step 704) and returns to step 700 to issue the next instruction in program order. Otherwise, if the address portion of the instruction is resolved, the processor checks the L1 data cache for a previously cached version of the cache line (step 705).

If the instruction is not a store instruction at step 701, the system then determines if the instruction has unresolved data dependencies (step 703). If so, the system defers the instruction (step 704) and returns to step 700 to issue the next instruction in program order.

Alternatively, if at step 703 the instruction is determined to have unresolved data dependencies, the processor checks the L1 data cache for a previously cached version of the cache line (step 705). If the cache line is not present in the L1 data cache, the processor checks the store buffer for a store to a matching cache line (step 706). Unless one of the checks returns a hit, the processor generates a fetch (step 708) for the cache line. Otherwise, the processor suppresses the fetch (step 707).

After generating or suppressing the fetch, if the instruction is a store and if the store data is available, the processor puts the store instruction in the store buffer, but not the deferred buffer. On the other hand, if the instruction is a store and if the store data is unavailable, the system puts the store instruction in both the store buffer and the deferred buffer (step 709). Next, the processor returns to step 700 to issue the next instruction in program order.

Selectively Fetching for a Store Instruction during Scout Mode

Figure 8:
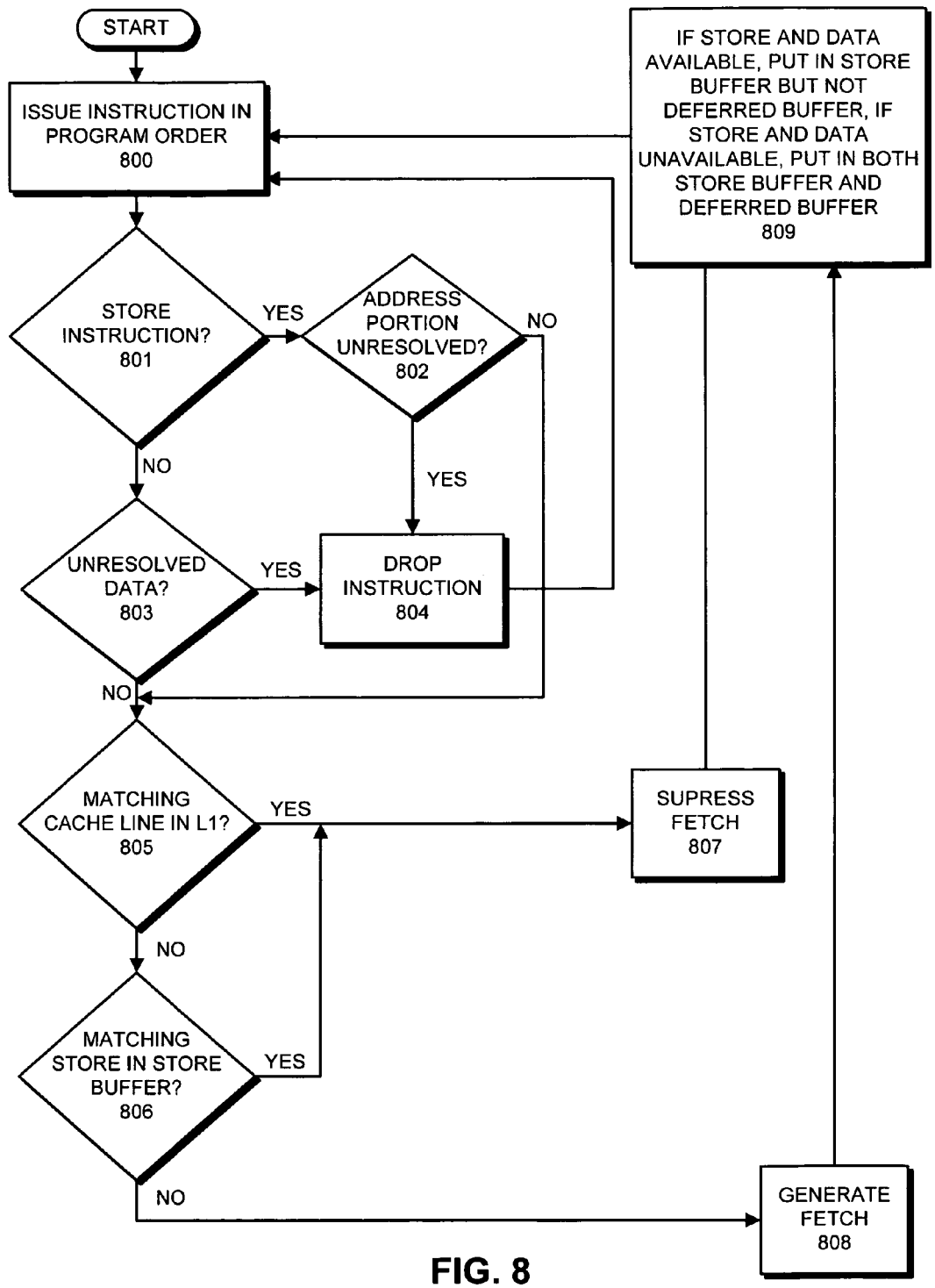
FIG. 8 presents a flow chart illustrating how a store is handled during scout mode in accordance with an embodiment of the present invention.

FIG. 8 presents a flow chart illustrating how a store is handled during scout mode in accordance with an embodiment of the present invention. This flow chart is identical to the flow chart in FIG. 7, except that instead of deferring the instruction in step 704, the processor simply drops the instruction in step 804.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for selectively fetching a store instruction during speculative-execution, comprising:
    an execution mechanism configured to issue instructions for execution in program order during execution of a program in a normal-execution mode;
    wherein upon encountering a launch condition during an instruction which causes the processor to enter a speculative-execution mode, the execution mechanism is configured to perform a checkpoint and begin execution of instructions in a speculative-execution mode;
    wherein upon encountering a store instruction during the speculative-execution mode, the execution mechanism is configured to,
        check an L1 data cache for a cache line containing a target for the store instruction and to check a store buffer for a store to the cache line containing the target for the store instruction;
        if the cache line containing the target for the store instruction is already present in the L1 data cache or a store to the cache line containing the target for the store instruction is already present in the store buffer, the execution mechanism is configured to suppress generation of a fetch for the cache line containing the target for the store instruction, and otherwise the execution mechanism is configured to generate a fetch for the cache line containing the target for the store instruction.

2. The apparatus of claim 1, wherein the execution mechanism is configured to check the store buffer by performing a content-addressable memory lookup on the store buffer.

3. The apparatus of claim 1, wherein the processor is part of a multiprocessor system wherein one or more L2 caches are shared between two or more processor cores.

4. The apparatus of claim 1, wherein the L1 data cache is accessed by a memory pipeline which allows simultaneous lookups and writes, thereby allowing the cache line check to take place without delaying other processor memory operations.

5. The apparatus of claim 4, wherein the L1 data cache contains MOESI (Modified-Owner-Exclusive-Shared-Invalid) status bits indicating an ownership status for each cache line.

6. The apparatus of claim 5,
    wherein the MOESI status bits are copied from a L2 cache to the L1 data cache when a cache line status changes, and
    wherein if the cache line is already present in the L1 data cache, generation of the fetch is suppressed only if the MOESI status bits indicate that the processor has write permission for the cache line.

7. The method of claim 5, generation of the fetch is suppressed during a store operation if the L1 data cache MOESI bits indicate that the local processor has 'M' or 'E' permissions on the cache line, because the local processor has write permission for cache lines in the 'M' or 'E' state.

8. The apparatus of claim 1,
    wherein the launch condition is a stall condition; and
    wherein the speculative-execution mode is a scout mode, wherein the execution mechanism is configured such that instructions are speculatively executed to fetch future loads, but wherein results are not committed to the architectural state of the processor.

9. The apparatus of claim 1, wherein the launch condition is an unresolved data dependency encountered while executing the launch-point instruction; and
    wherein the speculative-execution mode is an execute-ahead mode, wherein the execution mechanism is configured such that instructions that cannot be executed because of an unresolved data dependency are deferred, and wherein other non-deferred instructions are executed in program order.

10. The apparatus of claim 9, wherein the unresolved data dependency includes one or more of:
    a use of an operand that has not returned from a preceding load miss;
    a use of an operand that has not returned from a preceding translation lookaside buffer (TLB) miss;
    a use of an operand that has not returned from a preceding full or partial read-after-write (RAW) from store buffer operation; and
    a use of an operand that depends on another operand that is subject to an unresolved data dependency.

11. The apparatus of claim 1, wherein the execution mechanism is configured to return processor to normal execution mode when the processor encounters a condition that causes the processor to exit speculative-execution mode.

12. A computer system that selectively generates fetches for store instructions during speculative-execution, comprising:
    a processor;
    a memory;
    an execution mechanism within the processor, which is configured to issue instructions for execution in program order during execution of a program in a normal-execution mode;
    wherein upon encountering a launch condition during an instruction which causes a processor to enter a speculative-execution mode, the execution mechanism is configured to perform a checkpoint and begin to execute of instructions in a speculative-execution mode;
    wherein upon encountering a store instruction during the speculative-execution mode, the execution mechanism is configured to,
        check a L1 data cache for a cache line containing a target for the store instruction and a store buffer for a store to the cache line containing the target for the store instruction;
        if the cache line containing the target for the store instruction is already present in the L1 data cache or the store buffer, the execution mechanism is configured to suppress generation of a fetch for the cache line containing the target for the store instruction, otherwise the execution mechanism is configured to generate a fetch for the cache line containing the target for the store instruction.

13. A method for selectively fetching a store instruction during speculative-execution, comprising:

issuing instructions for execution in program order during execution of a program in a normal-execution mode;

upon encountering a launch condition during an instruction which causes a processor to enter a speculative-execution mode, performing a checkpoint and beginning execution of instructions in a speculative-execution mode;

upon encountering a store instruction during the speculative-execution mode, checking an L1 data cache for a cache line containing a target for the store instruction and checking a store buffer for a store to the cache line containing the target for the store instruction;

if the cache line containing the target for the store instruction is already present in the L1 data cache, or the store to the cache line containing the target for the store instruction is already present in the store buffer, suppressing generation of a fetch for the cache line containing the target for the store instruction, and otherwise generating a fetch for the cache line containing the target for the store instruction.

14. The method of claim 13, wherein checking the store buffer involves performing a content-addressable memory lookup on the store buffer.

15. The method of claim 13, wherein the L1 data cache is accessed by a memory pipeline which allows simultaneous lookups and writes, thereby allowing the cache line check to take place without delaying other processor memory operations.

16. The method of claim 13, wherein the processor is part of a multiprocessor system wherein one or more L2 caches are shared between two or more processor cores.

17. The method of claim 16, wherein the L1 data cache contains MOESI (Modified-Owner-Exclusive-Shared-Invalid) status bits indicating an ownership status for each cache line.

18. The method of claim 17, wherein the MOESI status bits are copied from a L2 cache to the L1 data cache when the cache line status changes; and wherein if the cache line is already present in the L1 data cache, generation of the fetch is suppressed only if the MOESI status bits indicate that the processor has write permission for the cache line.

19. The method of claim 17, generation of the fetch is suppressed during a store operation if the L1 data cache MOESI bits indicate that the local processor has 'M' or 'E' permissions on the cache line, because the local processor has write permission for cache lines in the 'M' or 'E' state.

20. The method of claim 13, wherein the launch condition is a stall condition; and wherein the speculative-execution mode is a scout mode, wherein instructions are speculatively executed to prefetch future loads, but wherein results are not committed to the architectural state of the processor.

* * * * *